(12) United States Patent
Chang

(10) Patent No.: US 7,334,920 B2
(45) Date of Patent: Feb. 26, 2008

(54) BACKLIGHT MODULE

(75) Inventor: Shao-Han Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/521,909

(22) Filed: Sep. 15, 2006

(65) Prior Publication Data

US 2007/0195523 A1    Aug. 23, 2007

(30) Foreign Application Priority Data

Feb. 23, 2006    (CN) .................. 2006 1 0033922

(51) Int. Cl.
*F21V 5/00*    (2006.01)
(52) U.S. Cl. .................. 362/326; 362/561; 362/309; 362/339
(58) Field of Classification Search ........... 362/627, 362/561, 326, 308, 331, 309, 339
See application file for complete search history.

(56) References Cited

U.S. PATENT DOCUMENTS

| | | | |
|---|---|---|---|
| 1,241,886 A * | 10/1917 | Rowe | 362/339 |
| 6,213,625 B1 * | 4/2001 | Leadford et al. | 362/331 |
| 2002/0149853 A1 * | 10/2002 | Liu et al. | 359/625 |
| 2004/0114346 A1 * | 6/2004 | Parker et al. | 362/31 |

* cited by examiner

*Primary Examiner*—Laura Tso
(74) *Attorney, Agent, or Firm*—Jeffrey T. Knapp

(57) ABSTRACT

A backlight module (20) includes a plurality of light sources (24) and an optical sheet (21). The optical sheet includes a light incident surface (211), a light emitting surface (212), and a plurality of inverted rectangular pyramid depressions (213). The light sources are positioned adjacent to the light incident surface. The light incident surface and the light emitting surface are at opposite sides of the optical sheet. The inverted rectangular pyramid depressions are defined on the light emitting surface and aligned regularly in a matrix manner.

18 Claims, 11 Drawing Sheets

BACKLIGHT MODULE

CROSS-REFERENCE TO RELATED APPLICATION

This application is related to co-pending U.S. patent application Ser. No. 11/309,623, entitled "OPTICAL SHEET", and filed on Sep. 1, 2006 by Shao-Han Chang. Such application has the same assignee as the present application. The disclosure of the above identified application is incorporated herein by reference.

BACKGROUND OF THE INVENTION

1. Field of the Invention

The present invention generally relates to backlight modules, such backlight modules typically being incorporated into devices such as liquid crystal displays.

2. Discussion of the Related Art

Most liquid crystal display (LCD) devices are passive devices in which images are displayed by controlling an amount of light inputted from an external light source. Thus, a separate light source (for example, backlight module) is generally employed to illuminate an LCD panel of the LCD device.

Referring to FIG. 1, a typical backlight module 10 is shown. The backlight module 10 includes a prism sheet 11, a first diffusion sheet 12, a second diffusion sheet 13, and a light source 15. The prism sheet 11 includes a light incident surface 111 and a light emitting surface 112 opposite to the light incident surface 111. A plurality of elongated V-shaped grooves (not labeled) extend out of the light emitting surface 112 regularly in a direction and parallel to each other. The prism sheet 11 is located between the first diffusion sheet 12 and the second diffusion sheet 13, with the light emitting surface 112 adjacent to the first diffusion sheet 12, and the light incident surface 111 adjacent to the second diffusion sheet 13. The light source 15 is located adjacent to the second diffusion sheet 13. When light rays from the light source 15 are emitted into the prism sheet 11 after being scattered from the second diffusion sheet 13, the light rays are refracted at/by the prism sheet 11 and emitted into the first diffusion sheet 12. The light rays are scattered from the first diffusion sheet 12 and finally emitted into an LCD panel (not shown) disposed on the first diffusion sheet 12.

In order to improve optical uniformity, a diffusion plate 14 is further provided. The diffusion plate 14 is located between the second diffusion sheet 13 and the light source 15. Referring to FIG. 2, the diffusion plate 14 includes a transparent main body 141 and a plurality of dispersion particles 142 dispersed in the main body 141. The dispersion particles 142 are configured for dispersing the light rays. When the light rays are emitted into the diffusion plate 14, the light rays are further scattered by the dispersion particles 142 again and again.

However, the backlight module 10 is Newton ring interference action-prone because the V-shaped grooves extend out of the light emitting surface 112 regularly in a direction, thus, decreasing the optical uniformity of the backlight module 10.

Therefore, a new backlight module is desired in order to overcome the above-described shortcomings.

SUMMARY

A backlight module includes a plurality of light sources and an optical sheet. The optical sheet includes a light incident surface, a light emitting surface, and a plurality of inverted rectangular pyramid depressions. The light sources are positioned adjacent to the light incident surface. The light incident surface and the light emitting surface are at opposite sides of the optical sheet. The inverted rectangular pyramid depressions are defined on the light emitting surface and aligned regularly in a matrix manner.

Other novel features will become more apparent from the following detailed description when taken in conjunction with the accompanying drawings.

BRIEF DESCRIPTION OF THE DRAWINGS

Many aspects of the backlight module can be better understood with reference to the following drawings. The components in the drawings are not necessarily drawn to scale, the emphasis instead being placed upon clearly illustrating the principles of the backlight module using the same. Moreover, in the drawings, like reference numerals designate corresponding parts throughout the several views.

DETAILED DESCRIPTION OF THE EMBODIMENTS

Figure 1:
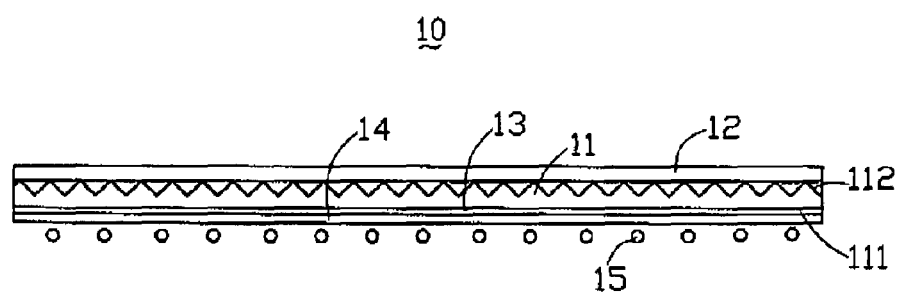
FIG. 1 is a schematic view of a typical backlight module including a diffusion plate.
Figure 2:
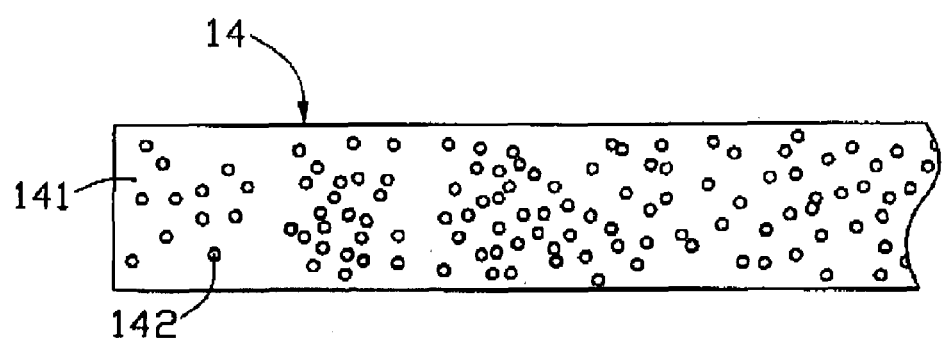
FIG. 2 is an enlarged, schematic view of part of the diffusion plate of FIG. 1.
Figure 3:
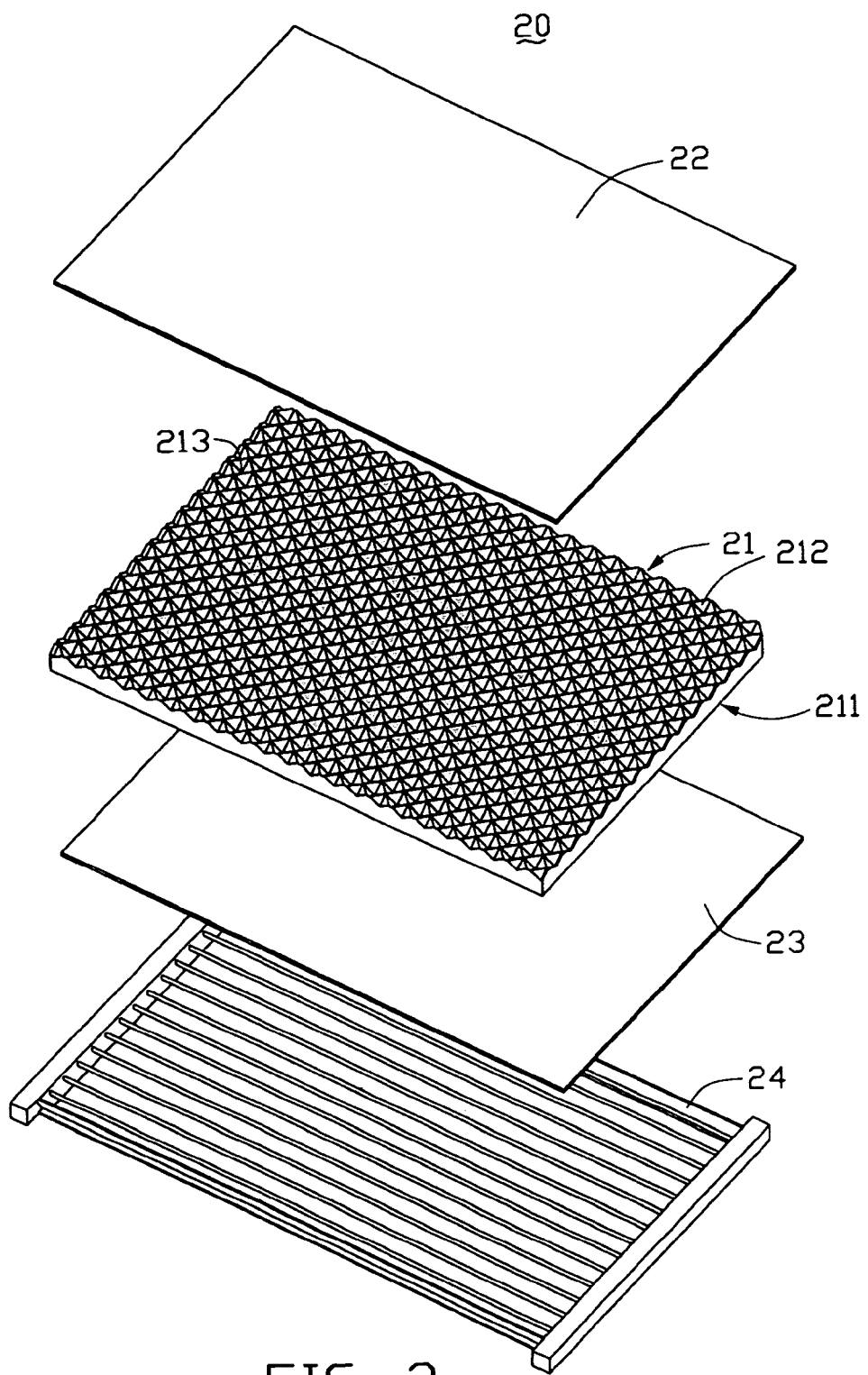
FIG. 3 is a schematic, exploded, isometric view of a backlight module in accordance with a first embodiment.

Referring to FIG. 3, a backlight module 20 according to a first embodiment is shown. The backlight module 20 orderly includes a first diffusion sheet 22, an optical sheet 21, a second diffusion sheet 23, and a plurality of light sources 24. The optical sheet 21 is located between the first diffusion sheet 22 and the second diffusion sheet 23, with a light emitting surface 212 facing the first diffusion sheet 22, and a light incident surface 211 facing the second diffusion sheet 23. The light sources 24 can be selected, for example, from either cold cathode fluorescent lamps (CCFLs) or light emitting diodes (LEDs). In the illustrated embodiment, the light sources 24 employ CCFLs.

When the backlight module 20 is in use, light rays from the light sources 24 are projected towards the second diffusion sheet 23. The light rays are scattered by the second diffusion sheet 23 and then emitted into the optical sheet 21. The light rays are refracted at the optical sheet 21 before emitted into the first diffusion sheet 22. The light rays are scattered from the first diffusion sheet 22 and finally emitted into an LCD panel (not shown).

Figure 4:
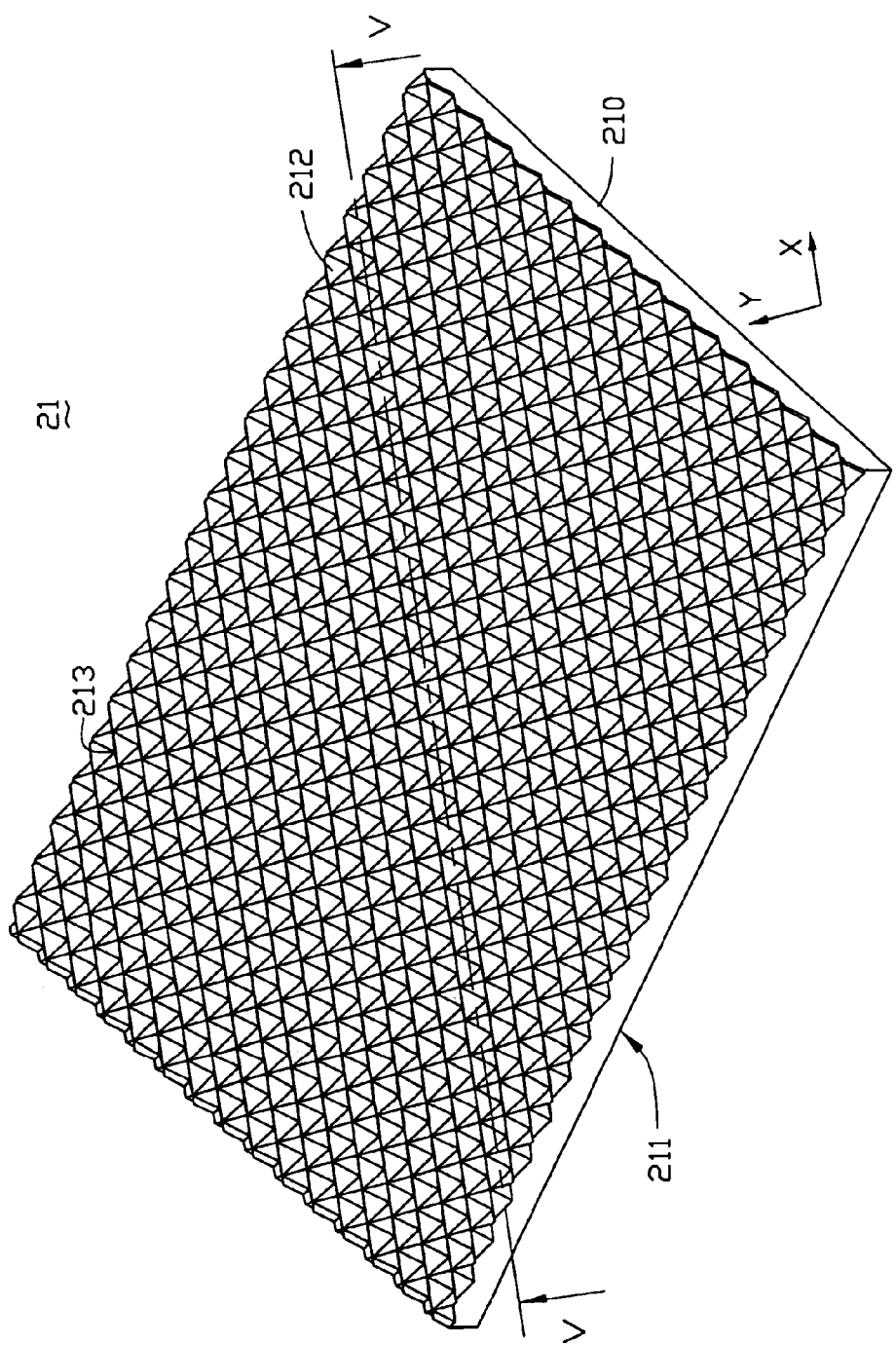
FIG. 4 is a schematic, isometric view of an optical sheet shown in FIG. 3.

Referring to FIG. 4, the optical sheet 21 includes a main body 210. The main body 210 is substantially transparent and is made of plastic material. The light incident surface 211 and the light emitting surface 212 are at opposite sides of the main body 210. The light incident surface 211 is a flat surface. The main body 210 includes a first pair and a second pair of opposite side walls (not labeled) between and adjoining the light incident surface 211 and the light emitting surface 212. The main body 210 defines a plurality of inverted rectangular pyramid depressions 213 on the light emitting surface 212.

Figure 5:
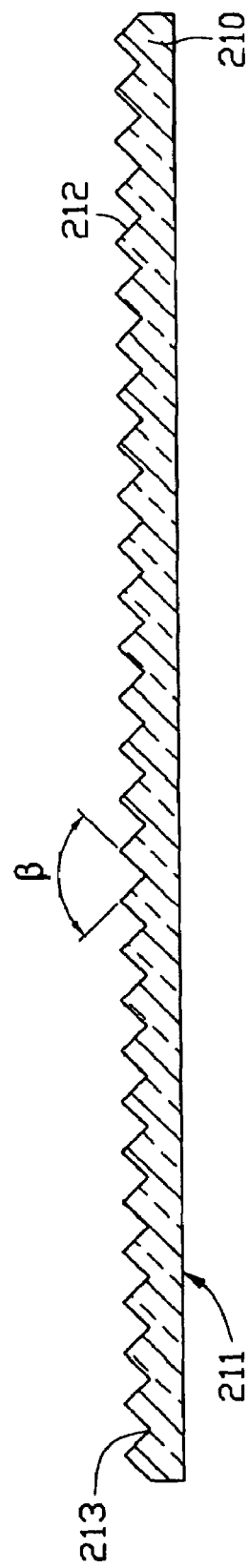
FIG. 5 is a schematic, cross-sectional view taken along line V-V of FIG. 4.

Also referring to FIG. 5, the inverted rectangular pyramid depressions 213 are aligned regularly in a matrix manner. Each of the inverted rectangular pyramid depressions 213 is configured to be an inverted square pyramid depression having a first opposite pair of surfaces and a second opposite pair of surfaces. The surfaces are triangular in shape and have similar triangular shapes. Each opposite pair of surfaces defines an intersectional angle β. The intersectional angle β may range from 45 degrees to 135 degrees. By appropriately configuring the intersectional angle β of each opposite pair of surfaces, the optical sheet 21 can achieve a desired light enhancement rate and a desired overall light emitting angle. The first opposite pairs of surfaces of the inverted rectangular pyramid depressions 213 are regularly aligned parallel to a first direction (the X-axis shown in FIG. 4). The second opposite pairs of surfaces of the inverted rectangular pyramid depressions 213 are regularly aligned parallel to a second direction (the Y-axis shown in FIG. 4). The first direction is perpendicular to the second direction. The first direction and the second direction both intersect with the first pair and the second pair of opposite side walls of the main body 210.

Figure 6:
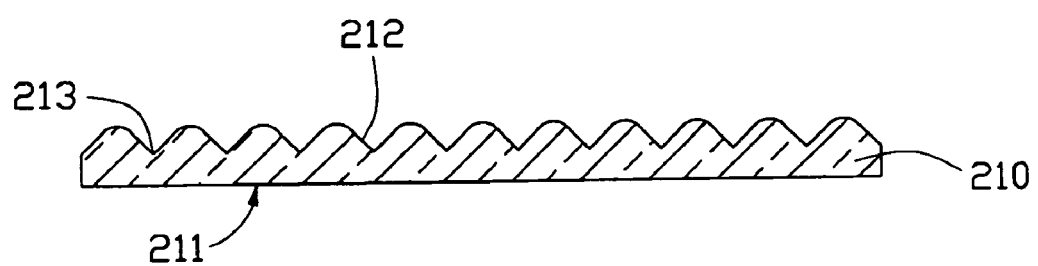
FIG. 6 is a schematic, partially cross-sectional view of an optical sheet according to a second preferred embodiment.
Figure 7:
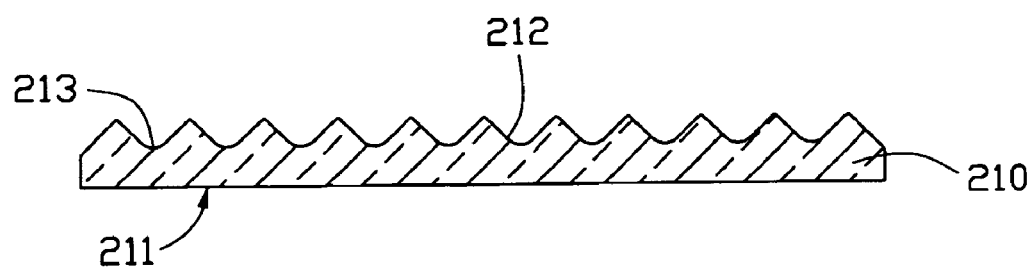
FIG. 7 is a schematic, partially cross-sectional view of an optical sheet according to a third preferred embodiment.
Figure 8:
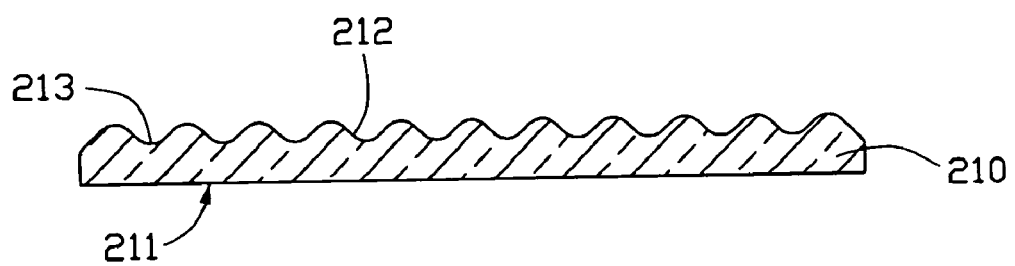
FIG. 8 is a schematic, partially cross-sectional view of an optical sheet according to a fourth preferred embodiment.

In order to limit a steep change of rate of brightness around edges of each pair of opposite inner side surfaces of the inverted rectangular pyramid depressions 213, a section of the edges of each pair of opposite inner side surfaces of the inverted rectangular pyramid depressions 214 may be smoothed (shown in FIGS. 6 and 7), any or all the edges of each pair of opposite inner side surfaces in of the inverted rectangular pyramid depressions 213 may also be smoothed (shown in FIG. 8).

Figure 9:
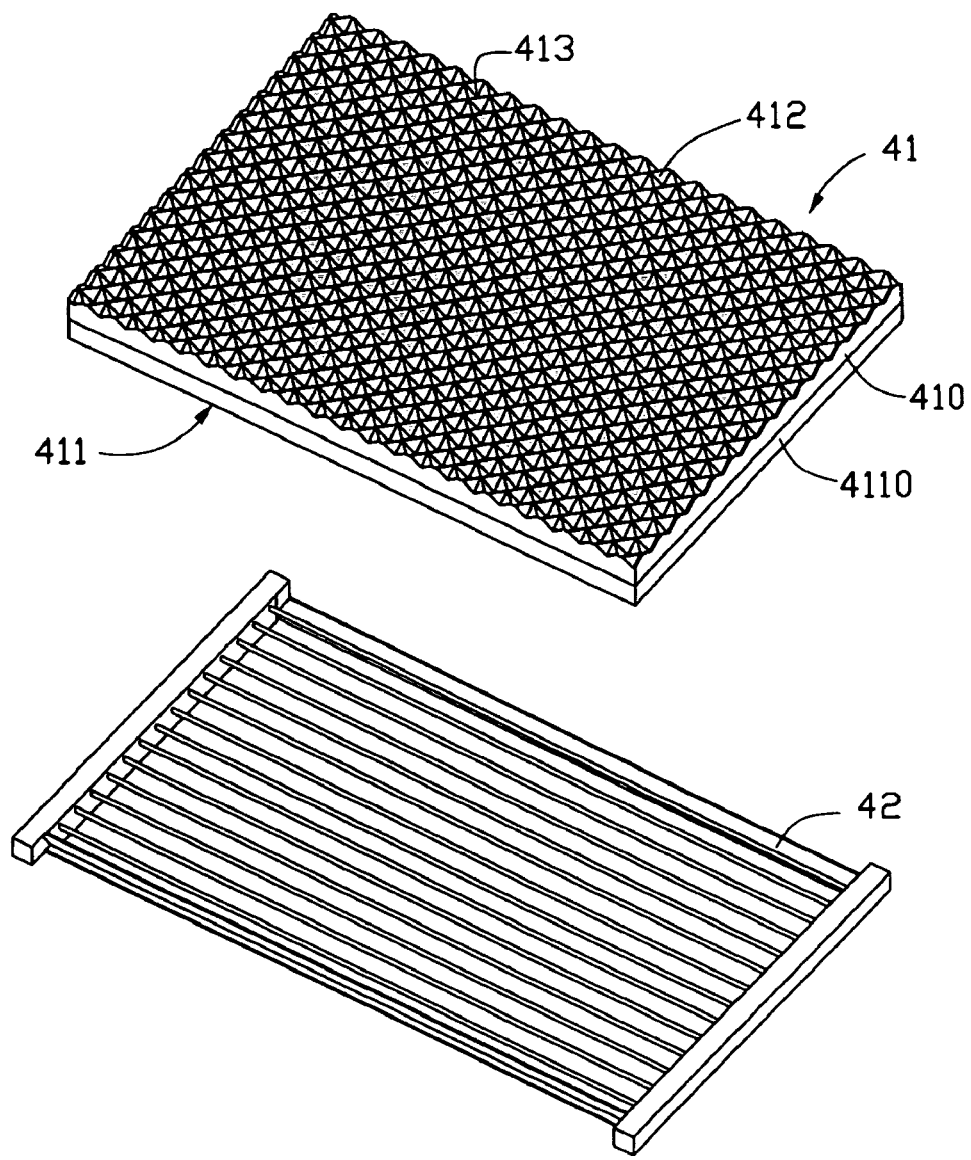
FIG. 9 is a schematic, exploded, isometric view of a backlight module in accordance with a second embodiment.
Figure 10:
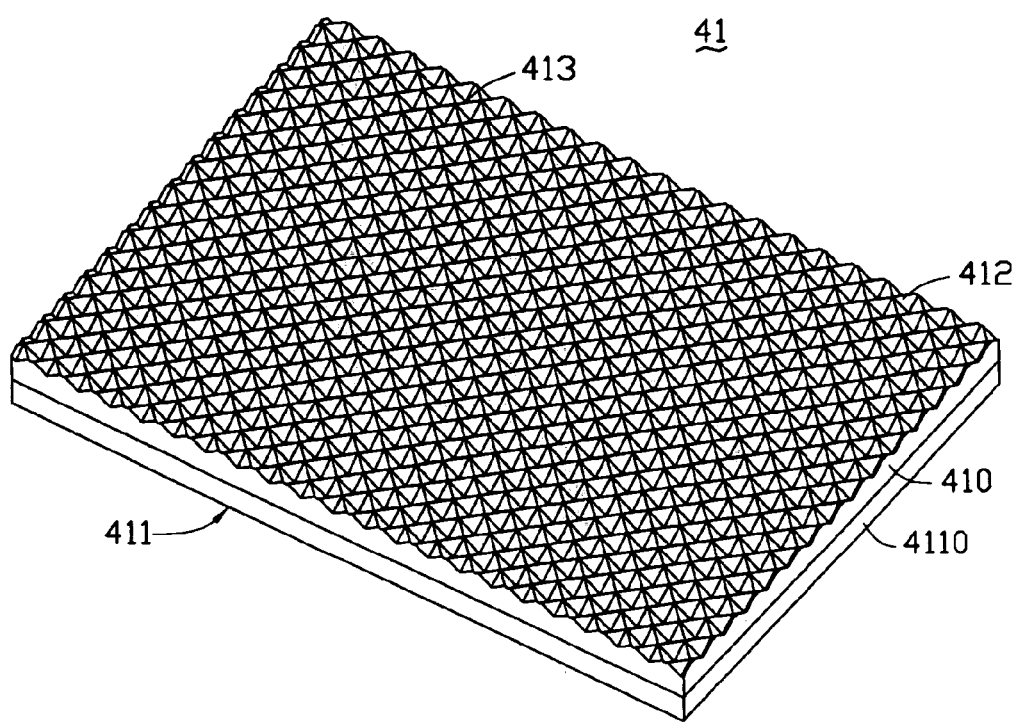
FIG. 10 is a schematic, isometric view of an optical sheet shown in FIG. 9.

Referring to FIGS. 9 and 10, a backlight module 40 including an optical sheet 41 and a plurality of light sources 42 according to a second embodiment is shown. The optical sheet 41 is similar in principle to the optical sheet 21 described previously, and includes a main body 410, and a first pair and a second pair of opposite side walls (not labeled) between and adjoining the light incident surface 411 and the light emitting surface 412. The light incident surface 411 and the light emitting surface 412 are at opposite sides of the main body 410. The main body 410 defines a plurality of inverted rectangular pyramid depressions 413 on the light emitting surface 412. The inverted rectangular pyramid depressions 413 are aligned regularly in a matrix manner.

Each of the inverted rectangular pyramid depressions 413 is configured to be an inverted square pyramid having two pairs of opposite inner side surfaces. The inner side surfaces are triangular in shape and have similar triangular shapes. Each pair of the opposite inner side surfaces defines an intersectional angle β. The intersectional angle β may range from 45 degrees to 135 degrees. A dispersion layer 4110 is formed on the light incident surface 411. The dispersion layer 4110 is configured for dispersing light rays. The dispersion layer 4110 is obtained by applying a rough surface or by coating a dispersion material, for example ink. The light sources 42 are located adjacent to the light incident surface 411 of the optical sheet 41. The light sources 42 can be selected, for example, from either cold cathode fluorescent lamps (CCFLs) or light emitting diodes (LEDs). In the illustrated embodiment, CCFLs are employed as the light sources 42.

When the backlight module 40 is in use, light rays from the light sources 42 are projected towards the light incident surface 411 of the optical sheet 41. The light rays are scattered at the dispersion layer 4110 and refracted at the inverted rectangular pyramid depressions 413 and the light emitting surface 412. The light rays are finally emitted into an LCD panel (not shown).

In the above-described backlight module 40, the inverted rectangular pyramid depressions 413 are aligned regularly in a matrix manner on the light emitting surface 412 of the optical sheet 41, thus, the backlight module 40 is less prone to Newton ring interference action, and to improve optical uniformity. In addition, the dispersion layer 4110 locates on the light incident surface 411 of the optical sheet 41. In one hand, the light rays projected towards the optical sheet 41 are scattered by the dispersions layer 4110, and to improve optical uniformity. In the other hand, the optical sheet may replace a diffusion sheet and a prism sheet. Therefore, decreasing the light rays escaping prematurely from the backlight module, and increasing brightness of the emitted light rays of the backlight module 40.

Figure 11:
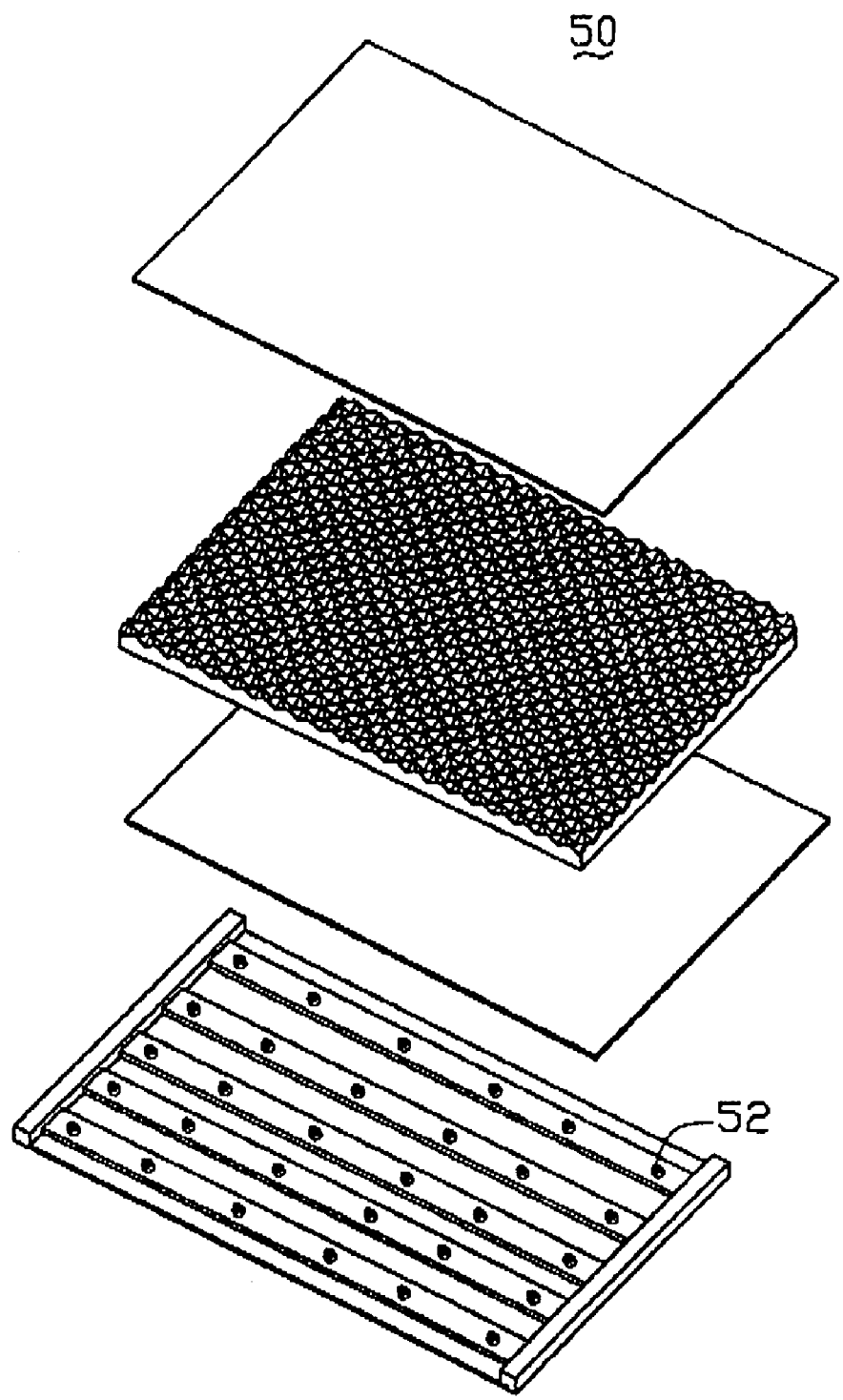
FIG. 11 is a schematic, exploded, isometric view of a backlight module in accordance with a third embodiment.

Referring to FIG. 11, a backlight module 50 according to a third embodiment is shown. The backlight module 50 is similar in principle to the backlight module 20 described previously. However, a plurality of light sources 52 of the backlight module 50 are light emitting diodes (LEDs).

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
    a plurality of light sources; and
    an optical sheet, the optical sheet including:
        a light incident surface and a light emitting surface positioned at opposite sides of the optical sheet, the light sources being positioned adjacent to the light incident surface; and
        a plurality of inverted rectangular pyramid depressions defined on the light emitting surface, the inverted rectangular pyramid depressions aligned regularly in a matrix manner.

2. The backlight module as claimed in claim 1, wherein each of the inverted rectangular pyramid depressions is an inverted square pyramid having a first opposite pair of inner side surfaces and a second opposite pair of inner side surfaces.

3. The backlight module as claimed in claim 2, wherein the first pair of each inverted rectangular pyramid depressions are regularly aligned parallel to a first direction, and the second pair of each inverted rectangular pyramid depressions are regularly aligned parallel to a second direction.

4. The backlight module as claimed in claim 3, wherein the first direction is perpendicular to the second direction.

5. The backlight module as claimed in claim 4, wherein the optical sheet further includes a first pair and a second pair of opposite side walls between and adjoining the light incident surface and the light emitting surface, and the first direction and the second direction both intersect with the first and the second pair of opposite side walls.

6. The backlight module as claimed in claim 5, wherein the first opposite pair of inner side surfaces defines an intersectional angle ranging from 45 degrees to 135 degrees, and the second opposite pair of inner side surfaces defines an intersectional angle ranging from 45 degrees to 135 degrees.

7. The backlight module as claimed in claim 1, wherein the inverted rectangular pyramid depressions have the same size.

8. The backlight module as claimed in claim 1, wherein the optical sheet further comprises a dispersion layer configured for dispersing light rays formed on the light incident surface.

9. The backlight module as claimed in claim 8, wherein the dispersion layer is obtained by applying a rough surface or by coating a dispersion material.

10. The backlight module as claimed in claim 1, further comprising a first diffusion sheet adjacent to the light emitting surface of the optical sheet, and a second diffusion sheet adjacent to the light incident surface of the optical sheet.

11. The backlight module as claimed in claim 1, wherein the light sources are cold cathode fluorescent lamps.

12. The backlight module as claimed in claim 1, wherein the light sources are light emitting diodes.

13. An optical sheet, including:
  a light incident surface and a light emitting surface positioned at opposite sides of the optical sheet;
  a first pair and a second pair of opposite side walls between and adjoining the light incident surface and the light emitting surface; and
  a plurality of inverted rectangular pyramid depressions defined on the light emitting surface, the inverted rectangular pyramid depressions aligned regularly in a matrix manner;
  wherein each of the inverted rectangular pyramid depressions is an inverted square pyramid having a first opposite pair of inner side surfaces aligned parallel to a first direction and a second opposite pair of inner side surfaces aligned parallel to a second direction, and the first direction and the second direction both intersect with the first pair and the second pair of opposite side walls.

14. The optical sheet as claimed in claim 13, wherein the first direction is perpendicular to the second direction.

15. The optical sheet as claimed in claim 13, wherein the first opposite pair of inner side surfaces defines an intersectional angle ranging from 45 degrees to 135 degrees, and the second opposite pair of inner side surfaces defines an intersectional angle ranging from 45 degrees to 135 degrees.

16. The optical sheet as claimed in claim 13, wherein the inverted rectangular pyramid depressions have the same size.

17. The optical sheet as claimed in claim 16, comprising a dispersion layer configured for dispersing light rays formed on the light incident surface.

18. The optical sheet as claimed in claim 17, wherein the dispersion layer is obtained by applying a rough surface or by coating a dispersion material.

* * * * *